United States Patent [19]

van den Broeke

[11] Patent Number: 4,787,019

[45] Date of Patent: Nov. 22, 1988

[54] LAMP FITTING WITH DIVISIBLE ATTACHMENT RING

[76] Inventor: Aleidus G. van den Broeke, Klokkendijk 12, 7467 PD Nijverdal, Netherlands

[21] Appl. No.: 24,132

[22] Filed: Mar. 10, 1987

[30] Foreign Application Priority Data

Apr. 1, 1986 [NL] Netherlands ............ 8600828

[51] Int. Cl.$^4$ ............................................. F21S 1/10
[52] U.S. Cl. ................................. 362/250; 362/418; 362/430; 362/431; 362/285
[58] Field of Search ............ 362/431, 430, 418, 410, 362/346, 285, 457; 248/125, 230, 295.1

[56] References Cited

U.S. PATENT DOCUMENTS

| | | | |
|---|---|---|---|
| 2,123,695 | 7/1938 | Elmer | 248/125 X |
| 2,456,179 | 12/1948 | Finer | 362/431 |
| 2,716,012 | 8/1955 | Simmons | 248/125 |
| 2,973,148 | 2/1961 | Franz | 248/230 X |
| 3,640,498 | 2/1972 | Aleks | 248/230 |
| 4,142,703 | 3/1979 | Moretto | 248/230 X |
| 4,166,601 | 9/1979 | Kato | 248/230 X |
| 4,225,104 | 9/1980 | Larson | 248/125 |
| 4,225,909 | 9/1980 | Scholtz et al. | 362/431 X |

FOREIGN PATENT DOCUMENTS

| | | |
|---|---|---|
| 0110286 | 11/1983 | European Pat. Off. . |
| 481315 | 8/1929 | Fed. Rep. of Germany . |
| 519342 | 2/1932 | Fed. Rep. of Germany . |
| 8412609.4 | 9/1984 | Fed. Rep. of Germany . |
| 8201458 | 4/1982 | Netherlands . |
| 163537 | 5/1921 | United Kingdom . |
| 1280979 | 7/1972 | United Kingdom . |

Primary Examiner—Ira S. Lazarus
Assistant Examiner—Richard R. Cole
Attorney, Agent, or Firm—John P. Snyder

[57] ABSTRACT

The invention relates to a lamp fitting intended for attachment to a tube, rod or other elongate member, for example the bar of a sunshade, the lamp fitting comprising a ring which bears at least one lamp and which is to be arranged round the elongate member and attached thereto by means of attachment means, the ring having an inner surface extending over some axial distance and co-operating with the elongate member, which inner surface has a shape adpated to the cross-sectional form of this elongate member. The invention has for its object to give a lamp fitting a form such that it can be attached from the side in any required position to a tube, bar or rod, without it being necessary to slide it on from a free end part. This purpose is realized according to the invention by a lamp fitting of the type referred to in the preamble which displays the feature that the attachment ring is formed so as to be divisible along its circumference and so that the constituent ring parts can be connected by coupling means such that a first ring part with its inner face can be set to co-operate in radial direction with the elongate member, following which the or each complementary ring part with its inner face can be set to co-operate with the elongate member and the constituent ring parts can be assembled into the ring by means of the coupling means.

6 Claims, 2 Drawing Sheets

LAMP FITTING WITH DIVISIBLE ATTACHMENT RING

The invention relates to a lamp fitting intended for attachment to a tube, rod or other elongate member, for example the bar of a sunshade, the lamp fitting comprising a ring which bears at least one lamp and which is to be arranged round the elongate member and attached thereto by means of attachment means, the ring having an inner surface extending over some axial distance and co-operating with the elongate member, which inner surface has a shape adapted to the cross sectional form of this elongate member. Such a lamp fitting is known for example from the German Gebrauchsmuster No. 84 12 609. The lamp fitting known from this German Gebrauchsmuster has the drawback that it can slide only in axial direction. In the case where, for example, a sunshade is present on a bar, this has first to be removed before the ring which forms part of the lamp fitting can slide onto the bar.

The invention has for its object to give a lamp fitting a form such that it can be attached from the side in any required position to a tube, bar or rod, without it being necessary to slide it on from a free end part.

This purpose is realized according to the invention by a lamp fitting of the type referred to in the preamble which displays the feature that the attachment ring is formed so as to be divisible along its circumference and so that the constituent ring parts can be connected by coupling means such that a first ring part with its inner face can be set to co-operate in radial direction with the elongate member, following which the or each complementary ring part with its inner face can be set to co-operate with the elongate member and the constituent ring parts can be assembled into the ring by means of the coupling means.

In order to ensure an excellent fixing to the elongate member using very simple means, the attachment means can comprise a wedge part to be placed between the elongate member and the inner face of the ring.

The wedge part can particularly take the form of a divisible ring, the inner face of which can grip over some axial distance round the elongate member and the outer face of which is slightly frustrum conical and can co-operate with the inner face of the ring, clamping as a wedge.

In a particular simple embodiment the ring parts are coupled for pivoting with each other.

A preferred embodiment displays the special feature that the inner face of the first ring part which is to be set to co-operate with the elongate member extends over 180 degrees, that extending from this inner face and tangential to it are two surfaces running parallel to each other, and that a complementary ring part having corresponding surfaces can be inserted by sliding between these faces of the first ring part. The coupling means can hereby take the particular form of co-operating steps, one at least being present on each of two co-operating surfaces.

In this last mentioned case, in order to be able to bring about co-operation of the first ring part and the second complementary ring part with the elongate member in the manner of a wedge that clamps, a variant can be applied in which the steps enclose an angle with the longitudinal axis of the ring which deviates in small measure from 0 degrees and in considerable measure from 90 degrees.

In a special embodiment the steps form a tongue and groove connection, and particularly a dovetail joint.

In a preferred embodiment the ring is hollow and at least one of both axial end walls can be removed. In this way is ensured that the interior of the ring is accessible, for example for replacement or repair of the electrical wiring.

The invention will now be elucidated with reference to the drawing of two embodiments, the invention not however being limited to these. In the drawing.

Figure 1:
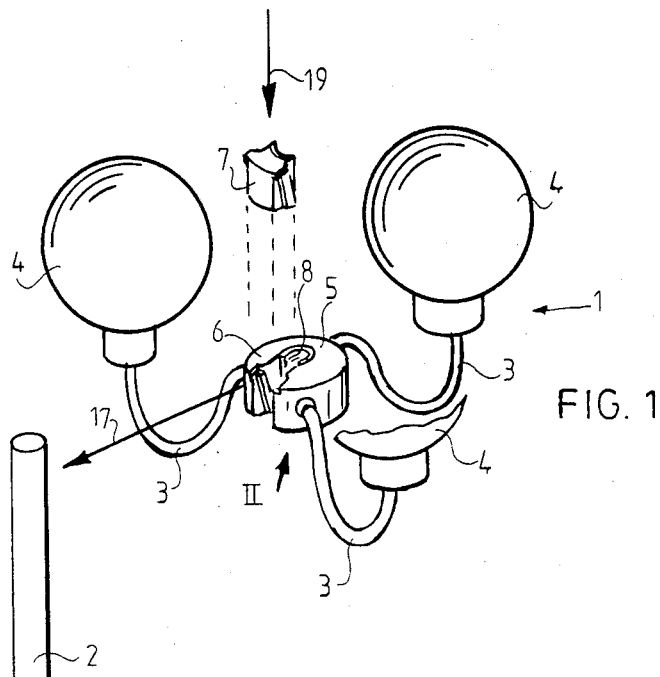
FIG. 1 shows a schematic perspective view of a lamp fitting according to the invention for clarification of the manner of attachment to a pole.
Figure 2:
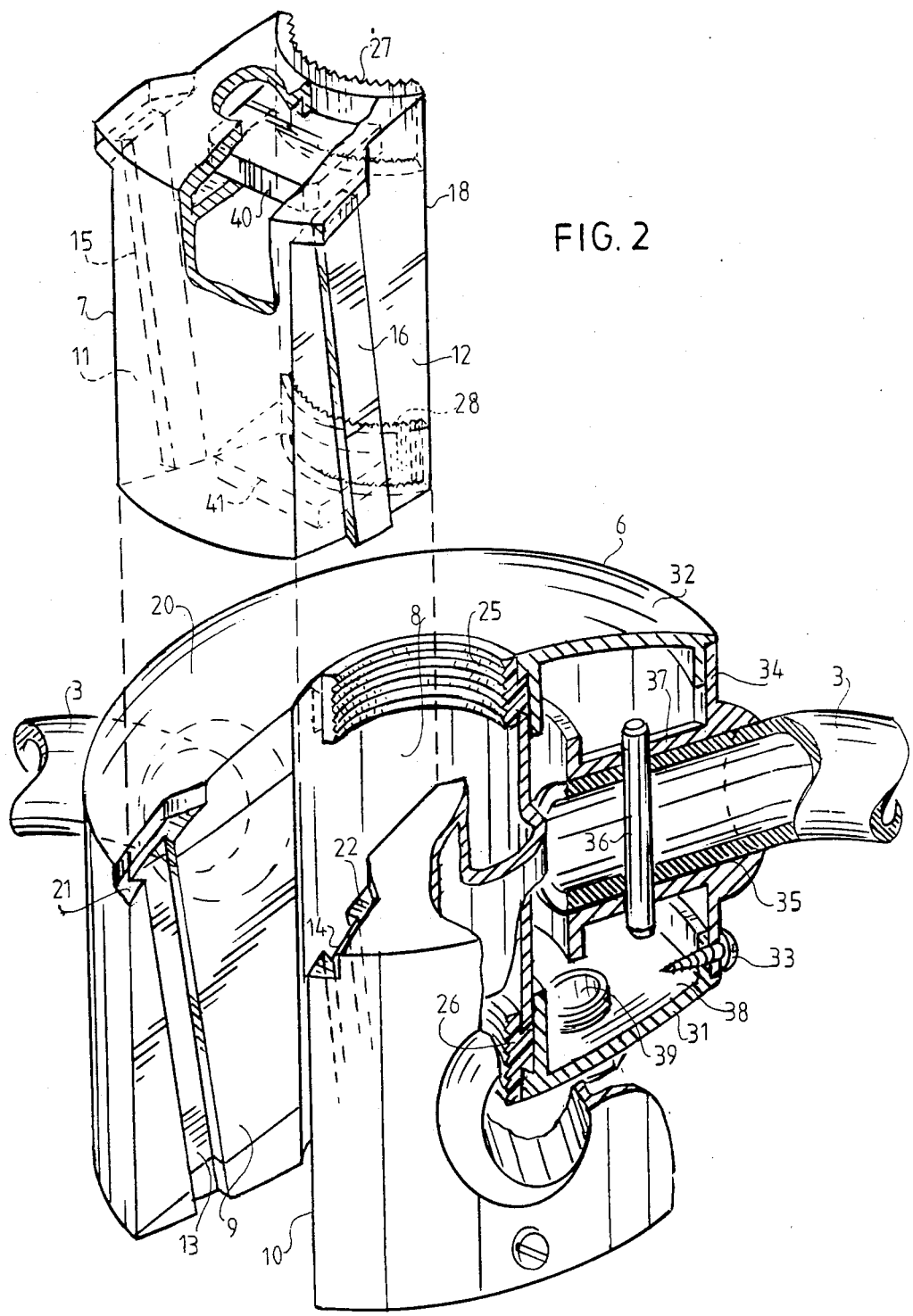
FIG. 2 is the detail II in accordance with FIG. 1, that is, a partially broken away perspective view of the attachment ring.

FIG. 1 shows a lamp fitting 1, intended for attachment to a pole 2. The lamp fitting comprises a ring 5 supporting a set of three spherical lamps 4 by means of curved tubes 3, which ring is to be fitted round the pole 2 and attached to it by means of attachment means to be described later. This ring 5 takes, as FIG. 1 and also FIG. 2 show, a divisible form. The ring 5 comprises a first ring part 6 and a second, complementary ring part 7.

The inner face 8 of first ring part 6 to be set into co-operation with pole 2 extends over 180 degrees, in this case in the form of a semi-circular cylinder, while extending from this inner face and tangential to it are two surfaces 9, 10 parallel to each other. The second ring part 7 can be inserted by sliding with corresponding surfaces 11, 12 between these surfaces 9, 10 of the first ring part. The faces 9, 10 each have a dovetail-shaped groove, 13, 14 respectively, which grooves 13, 14 can co-operate in the manner of a dovetail joint with correspondingly shaped tongues 15, 16 on the surfaces 11, 12 respectively of second ring part 7.

As is shown especially clearly in FIG. 2, the grooves 13, 14 and the tongues 15, 16 enclose an angle with the longitudinal axis of the ring deviating in small measure from 0 degrees and in considerable measure from 90 degrees. The relative longitudinal movement between the keying elements acts to force the parts radially inward toward the support pole.

FIG. 1 shows that first ring part 6 can be set with its inner face 8 into co-operation with pole 2 in radial direction, as indicated with the arrow 17, after which the second, complementary ring part 7 can be set with its inner surface 18 into co-operation with pole 2 by forming the above described dovetail connection. FIG. 1 shows using arrow 19 the manner in which second ring part 7 is connected to the first ring part 6 that has been set into co-operation with pole 2.

FIG. 2 shows that parts 21, 22 recessed into the upper surface 20 are present on the upper end of grooves 13, 14. These can co-operate in the manner of a stop with the complementary protruding parts 23, 24 located accordingly in a position above tongues 15, 16 of second ring part 7. This ensures that the form of the closed ring is wholly smooth. When the fitting is arranged all that has to be ensured is that the protruding parts 23, 24 are co-operating as stops with the recessed parts 21, 22.

In order to ensure a good friction coupling with pole 2 the end zones of inner face 8 of first ring part 6 and the inner surface 18 of second ring part 7 are provided with somewhat elastic coating layers 25, 26, 27, 28. It will be clearly apparent from FIG. 2 that the elastic coating layers are connected to ring part 6 by means of a dovetail connection. FIG. 2 shows clearly that a central portion 30 is provided at its ends with the coating layers 25, 26, after which covers 31, 32 are placed in position. The upper cover 32 is fitted permanently in this embodiment by means of an adhesive connection. The lower cover 31 can be disconnected by means of screw connections 33 which co-operate with an outer portion 34 that is coupled to upper cover 32.

Prior to fitting of the lower cover 31 the tubes 3 are placed through cylindrical, continuous holes 35 in the outer portion 34, these tubes serving to support the spherical lamps 4 and to accommodate electricity supply cables (not shown). Tubes 3 are fixed into the walls 37 of holes 35 by means of pins 36. After arranging the wiring in the cavity 38 enclosed by first ring part 7 and in tubes 3 the lower cover 31 can be placed in position and joined to outer portion 34 with screw connections 33. Lower cover 31 has a hole 39 for passage of an electrical connecting cord.

The elastic coating layers 27, 28 of second ring part 7 are fixed through clamping by means of lips 40, 41 in spaces present for that purpose.

It will be apparent that it must be possible to arrange the ring 5 so that it is tight fitting around pole 2. In the case this pole has too great a diameter, the ring cannot be positioned and either another pole or another ring will have to be selected. In the case the pole is too thin, a filling element can if required be placed between pole 2 and ring 5. Such a filling element can, as will be discussed later with reference to FIG. 3, also serve as wedge part, in order to ensure clamp fitting between the ring and pole 2.

Figure 3:
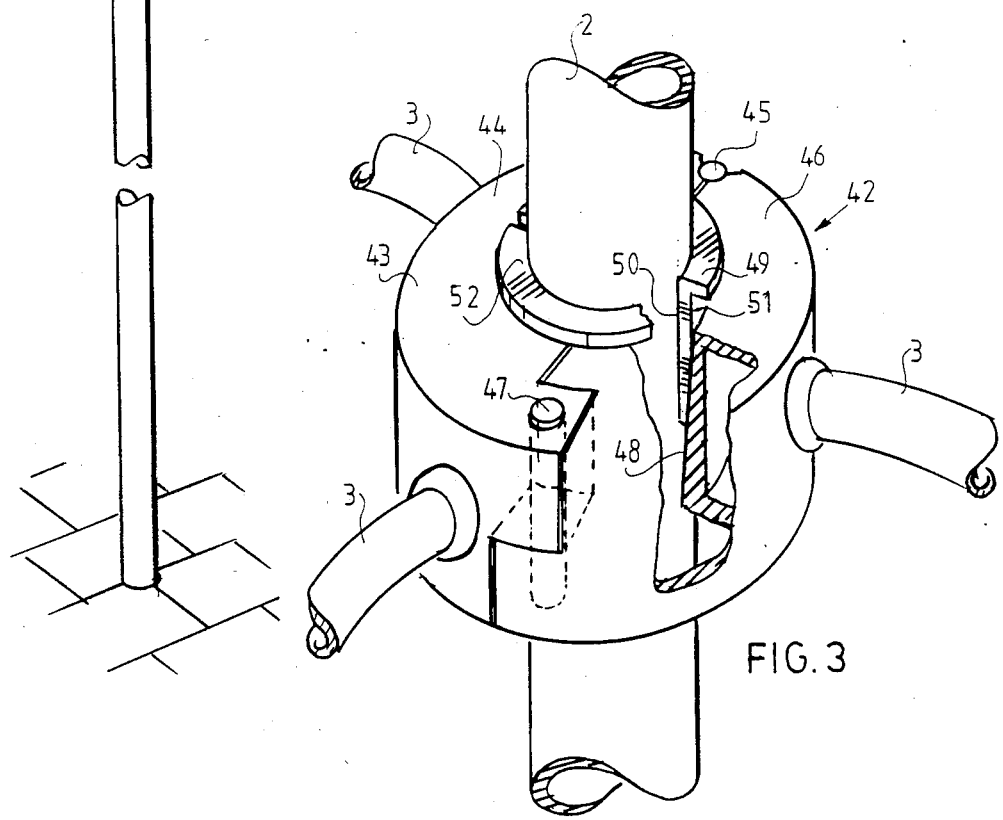
FIG. 3 shows a partly broken away perspective view of a variant.

FIG. 3 shows a lamp fitting 42 with a ring 43 which comprises a first ring part 44 and a second ring part 46 connected to the first by means of a hinge 45. Ring parts 44 and 46 can be placed around pole 2 in the opened position of ring 43, subsequent to which ring 43 is closed by means of a coupling pin 47.

The inner face 48 of ring 43 has a slightly conical form such that a ring 49 in divided form can be placed between pole 2 and the inner face 48 of the closed ring 43. The ring 49 displays an inner surface 50 having a circular cylindrical form the same as that of pole 2. The outer surface 51 of the wedging ring 49 has a downwardly tapering shape corresponding to the inner surface 48 of ring 43. Pressing in wedging ring 49 using the flanged edge 52 present for that purpose ensures excellent fitting and clamping of lamp fitting 42 onto the pole 2.

It will be apparent that various combinations of the aspects described and further variants are possible. Thus, if required, use can also be made of wedging ring 49 in the embodiments as according to FIGS. 1 and 2.

Attention is drawn to the fact that the embodiment as in FIG. 2 is given preference because in this embodiment it is only the first ring part 6 which has to support the tubes 3. This means that the electrical wiring has only to be located in the cavity 38 which is enclosed by first ring part 6. In the embodiment as according to FIG. 3 a junction with an electrical connector must be located in the zone of hinge 45, and this cannot be avoided because the electrical wiring has to be situated in the first ring part 44 as well as the second ring part 46. This is an additional complication with respect to electrical safety requirements. Attention is drawn in this context to the fact that it must be possible to give a lamp fitting of the current type a watertight form, which is more difficult in the case of the embodiment as according to FIG. 3 for the above mentioned reasons.

What is claimed:

1. A lamp fitting assembly comprising the combination of collar means having an axial opening therethrough for receiving a support pole in surrounding relation thereto, a plurality of tubes extending radially from the collar means, a lamp fixed to each tube in radially outwardly spaced relation to the collar means, the collar means including separate parts which are movable relative to each other between a first position defining a radial gap permitting the collar means to be moved radially to accept the pole at any position along its length and a second position enclosing the entire circumference of the pole in circumferentially embracing relation thereto, coupling means for holding the parts in the second position enclosing and circumferentially embracing the pole, one of the parts being C-shaped to define, by itself, the gap which accepts the pole, and a second part being of truncated pie-shape to fit snugly within the gap, the C-shaped one part comprising upper and lower C-shaped end walls and concentric inner and outer part-tubular upright walls, the lower end wall being removable to gain access to the interior of the one part, and electrical wire lead-in means in the lower end wall.

2. A lamp fitting assembly comprising the combination of collar means having an axial opening therethrough for receiving a support pole in surrounding relation thereto, a plurality of tubes extending radially from the collar means, a lamp fixed to each tube in radially outwardly spaced relation to the collar means, the collar means including separate parts which are movable relative to each other between a first position defining a radial gap permitting the collar means to be moved radially to accept the pole at any position along its length and a second position enclosing the entire circumference of the pole in circumferentially embracing relation thereto, and coupling means for holding the parts in the second position enclosing and circumferentially embracing the pole, one of the separate parts being C-shaped comprising upper and lower C-shaped end walls and concentric inner and outer part-tubular upright walls defining a hollow interior communicating with the interiors of the tubes to route electrical wire to the lamps, the lower end wall being removable to gain access to the interior of the one part, and electrical wire lead-in means for routing electrical wire to the interior of the one part.

3. A lamp fitting assembly comprising the combination of collar means having an axial opening therethrough for receiving a support pole in surrounding relation thereto, at least one tube extending radially from the collar means, a lamp fixed to the tube in radially outwardly spaced relation to the collar means, the collar means including separate parts which are movable relative to each other between a first position defining a radial gap permitting the collar means to be moved radially to accept the pole at any position along its length and a second position enclosing the entire circumference of the pole in circumferentially embracing relation thereto, and coupling means for holding the parts in the second position enclosing and circumferentially embracing the pole, one of the parts being of pie-shaped configuration having converging opposite sides and the other part having converging sides defining a pie-shaped recess for receiving the one part, the coupling means comprising keying elements between the opposite sides of one part and the opposite sides of the other part, the keying elements extending at an angle longitudinally with respect to the axis of the support pole to force the parts radially inwardly in response to relative longitudinal movement therebetween.

4. A lamp assembly as defined in claim 3 wherein the parts are provided with cooperative flange and notch structure which limits the longitudinal movement therebetween.

5. A lamp assembly as defined in claim 4 including elastic members cooperating with the parts to grip the pole when the parts are forced radially inwardly.

6. A lamp assembly as defined in claim 3 wherein each part is formed with inner and outer concentric tubular portions defining chambers therebetween and end walls at the ends of the tubular portions, one of the outer tubular portions having an opening therein for receiving electrical conductors and one of the wall members being removable to gain access to the electrical conductors within the chambers internally of the parts.

* * * * *